(12) United States Patent
Yamazaki

(10) Patent No.: US 11,305,438 B2
(45) Date of Patent: Apr. 19, 2022

(54) ROBOT CONTROL DEVICE, ROBOT, AND ROBOT SYSTEM

(71) Applicant: Seiko Epson Corporation, Tokyo (JP)

(72) Inventor: Takema Yamazaki, Fujimi (JP)

(73) Assignee: Seiko Epson Corporation

( * ) Notice: Subject to any disclaimer, the term of this patent is extended or adjusted under 35 U.S.C. 154(b) by 670 days.

(21) Appl. No.: 16/140,729

(22) Filed: Sep. 25, 2018

(65) Prior Publication Data

US 2019/0091881 A1    Mar. 28, 2019

(30) Foreign Application Priority Data

Sep. 27, 2017  (JP) .............................. JP2017-186230

(51) Int. Cl.
| | |
|---|---|
| B25J 19/00 | (2006.01) |
| H02K 11/02 | (2016.01) |
| H02M 1/12 | (2006.01) |
| H02P 27/08 | (2006.01) |
| H02P 3/22 | (2006.01) |
| B25J 9/16 | (2006.01) |

(52) U.S. Cl.
CPC ......... *B25J 19/0029* (2013.01); *B25J 9/1674* (2013.01); *H02K 11/02* (2013.01); *H02M 1/12* (2013.01); *H02P 3/22* (2013.01); *H02P 27/08* (2013.01); *G05B 2219/45083* (2013.01); *H02M 1/126* (2013.01)

(58) Field of Classification Search
USPC .................................................. 318/568.11
See application file for complete search history.

(56) References Cited

U.S. PATENT DOCUMENTS

| | | | | |
|---|---|---|---|---|
| 3,991,352 | A * | 11/1976 | Fry ........................... | H02P 3/24 318/759 |
| 8,054,015 | B2 * | 11/2011 | Iwashita ................... | H02P 3/18 318/376 |
| 2007/0012492 | A1 * | 1/2007 | Deng ....................... | B60W 20/00 180/65.1 |
| 2009/0066272 | A1 * | 3/2009 | Jobard ..................... | B60L 7/003 318/375 |
| 2012/0049803 | A1 * | 3/2012 | Lee ......................... | H01M 10/44 320/137 |
| 2013/0207581 | A1 * | 8/2013 | Aoki ........................ | H02P 6/24 318/400.21 |
| 2013/0221888 | A1 * | 8/2013 | Horikoshi ............... | H02P 27/06 318/400.29 |
| 2016/0118866 | A1 * | 4/2016 | Yamazaki ............ | H02K 11/026 310/72 |

(Continued)

FOREIGN PATENT DOCUMENTS

JP    2016-078212 A    5/2016

*Primary Examiner* — Jorge L Carrasquillo
(74) *Attorney, Agent, or Firm* — Harness, Dickey & Pierce, P.L.C.

(57) ABSTRACT

A robot control device that controls a robot including a motor, the robot control device comprising: a power converter that is connected to the motor by a power line and converts supplied power to power to be supplied to the motor; a brake that brakes the motor by short-circuiting the power lines, and an inductance element that is provided on the power line and positioned closer to the power converter side than a connection point between the brake and the power line.

19 Claims, 5 Drawing Sheets

(56) References Cited

U.S. PATENT DOCUMENTS

| | | | |
|---|---|---|---|
| 2016/0129598 A1* | 5/2016 | Geiler | B25J 19/0004 |
| | | | 700/261 |
| 2016/0243710 A1* | 8/2016 | Tagashira | B25J 19/0004 |
| 2016/0329840 A1* | 11/2016 | Mori | H02K 7/106 |
| 2018/0287519 A1* | 10/2018 | Ishida | G01R 31/343 |

* cited by examiner

ROBOT CONTROL DEVICE, ROBOT, AND ROBOT SYSTEM

BACKGROUND

1. Technical Field

The present invention relates to a robot control device, a robot, and a robot system.

2. Related Art

Research and development of technologies for suppressing noise generated when a robot is controlled by a robot control device are being conducted.

In relation to this technology, there is known a robot which includes a drive unit, a flexible substrate having a power line for transmitting power to the drive unit, and a choke coil connected to the power line and in which a band elimination filter is formed by a parasitic capacitor, which is formed by the power line, and the choke coil (See JP-A-2016-78212).

Here, in a case where such a robot includes a dynamic brake for braking the drive unit by short-circuiting the power lines, a regenerative current generated from the drive unit due to a short circuit between the power lines may cause the choke coil to generate heat, depending on a position where the choke coil is provided. As the size of the choke coil increases, heat resistance of the choke coil increases and a price thereof increases in many cases. For that reason, in a case where an amount of heat generated by the choke coil due to the regenerative current is high, there are cases where the robot has difficulty in miniaturizing the choke coil and suppressing the manufacturing cost.

SUMMARY

An aspect of the invention is directed to a robot control device that controls a robot including a drive unit and includes a power conversion unit that is connected to the drive unit by a power line and converts supplied power to power to be supplied to the drive unit, a braking unit that brakes the drive unit by short-circuiting the power lines, and an inductance element that is provided on the power line and positioned closer to the power conversion unit side than a connection point between the braking unit and the power line.

With this configuration, the robot control device can suppress noise by the inductance element and may suppress heat generation of the inductance element due to a short circuit between the power lines.

In another aspect of the invention, the robot control device may be configured such that the robot control device further includes a detection unit that detects an abnormality and the braking unit short-circuits the power lines in a case where the detection unit detects an abnormality.

With this configuration, the robot control device can suppress heat generation of the inductance element due to the short circuit between the power lines according to detection of the abnormality by the detection unit.

In another aspect of the invention, the robot control device may be configured such that the power conversion unit includes a plurality of switching elements and turns switches of the plurality of switching elements OFF in a case where the detection unit detects an abnormality.

With this configuration, the robot control device can suppress heat generation of the inductance element due to a short circuit between the power lines while suppressing current from flowing into the power conversion unit due to the short circuit between the power lines.

In another aspect of the invention, the robot control device may be configured such that the detection unit is integrated with the power conversion unit.

With this configuration, the robot control device can suppress heat generation of the inductance element due to a short circuit between the power lines according to detection of the abnormality by the detection unit integrated with the power conversion unit.

In another aspect of the invention, the robot control device may be configured such that the power conversion unit, the detection unit, the braking unit, and the inductance element are mounted on the same substrate.

With this configuration, the robot control device can suppress heat generation of the inductance element mounted on the same substrate together with the power conversion unit, the detection unit and the braking unit, and the heat generation of the inductance element is due to a short circuit between the power lines.

In another aspect of the invention, the robot control device may be configured such that the braking unit short-circuits the power lines in a case where a voltage supplied to the braking unit becomes equal to or less than a predetermined value.

With this configuration, the robot control device can suppress heat generation of the inductance element due to a short circuit between the power lines in response to the voltage supplied to the braking unit becoming equal to or less than the predetermined value.

In another aspect of the invention, the robot control device may be configured such that a current detection unit that is provided on the power line and is positioned between the power conversion unit and the inductance element is further included.

With this configuration, the robot control device can suppress heat generation of the inductance element due to a short circuit between the power lines while performing control based on a current flowing in the power line.

In another aspect of the invention, the robot control device may be configured such that the drive unit includes a motor driven by a multi-phase alternating current.

With this configuration, the robot control device can suppress noise by the inductance element, and can suppress heat generation of the inductance element due to a short circuit between the power lines connected to the motor driven by the multi-phase alternating current.

Another aspect of the invention is directed to a robot that is controlled by the robot control device described above.

With this configuration, the robot can suppress noise by an inductance element, and can suppress heat generation of the inductance element due to a short circuit between power lines.

Another aspect of the invention is directed to a robot system that includes the robot control device described above and the robot.

With this configuration, the robot system can suppress noise by an inductance element, and can suppress heat generation of the inductance element due to a short circuit between power lines.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

In the following, embodiments of the invention will be described with reference to the drawings.
Configuration of Robot System First, a configuration of a robot system 1 will be described.

Figure 1:
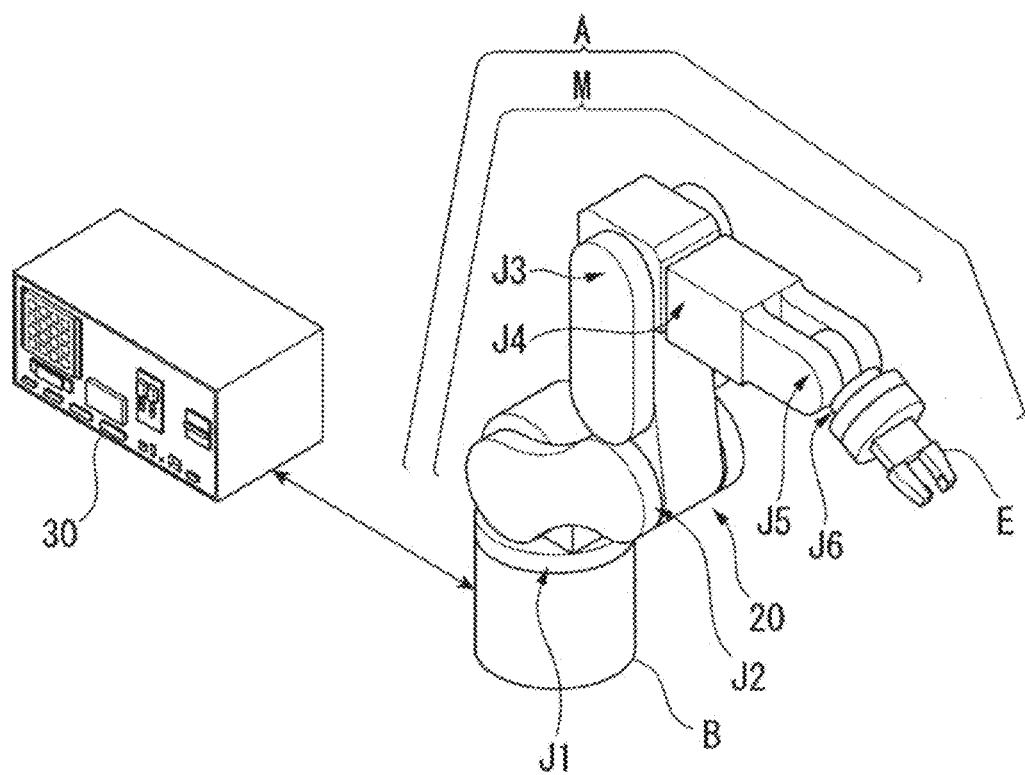
FIG. 1 is a diagram illustrating an example of a configuration of a robot system according to an embodiment.

FIG. 1 is a diagram illustrating an example of a configuration of a robot system 1 according to the embodiment. The robot system 1 includes a robot 20 and a robot control device 30. In the robot system 1, the robot 20 and the robot control device 30 are configured separately, but instead of being separately configured, the robot 20 and the robot control device 30 may be integrally configured. In this case, the robot control device 30 is built in the robot 20. Further, in this case, the robot system 1 includes the robot 20 configured integrally with the robot control device 30.

The robot 20 is a single arm robot including a movable portion A and a supporting stand B for supporting the movable portion A. The single-arm robot is a robot including one arm like the movable portion A in this example. The robot 20 may be a multi-arm robot instead of a single-arm robot. The multi-arm robot is a robot including two or more arms (for example, two or more movable portions A). Among the multi-arm robots, a robot including two arms (for example, two movable portions A) is also called a dual arm robot. That is, the robot 20 may be a dual arm robot including two arms or a multi-arm robot including three or more arms (for example, three or more movable portions A). The robot 20 may be another robot such as a SCARA robot, an orthogonal coordinate robot, or a cylindrical robot. The orthogonal coordinate robot is, for example, a gantry robot.

The movable portion A includes an end effector E and a manipulator M. The end effector E is an end effector that holds an object. In this example, the end effector E1 includes a finger portion, and holds the object by gripping the object by the finger portion. Instead of this, the end effector E may be configured to hold the object by lifting the object with suction of air, magnetic force, another jig, or the like. In this example, "holding" means to bring the object into a state where it is possible to lift the object.

The end effector E is communicably connected to the robot control device 30 by a cable. With this, the end effector E performs an operation based on a control signal acquired from the robot control device 30. Wired communication via a cable is performed according to standards such as Ethernet (registered trademark) and USB, for example. The end effector E may be configured to be connected to the robot control device by wireless communication performed according to a communication standard such as Wi-Fi (registered trademark).

The manipulator M includes six joints of joints J1 to J6. Each of the six joints includes a drive unit. For the sake of convenience of explanation, a drive unit included in the joint J1 is referred to as a drive unit M1, a drive unit included in the joint J2 is referred to as a drive unit M2, a drive unit included in the joint J3 is referred to as a drive unit M3, a drive unit included in the joint J4 is referred to as a drive unit M4, a drive unit included in the joint J5 is referred to as a drive unit M5, and a drive unit included in the joint J6 is referred to as a drive unit M6.

Each of the drive units M1 to M6 is a motor driven by a multi-phase AC. In the following, as an example, a case where each of the drive units M1 to M6 is a motor driven by a three-phase AC will be described. Each of the drive units M1 to M6 may be a motor driven by AC of two phases or may be a motor driven by AC of four or more phases.

That is, the movable portion A including the manipulator M is a six-axis vertical articulated arm. The movable portion A performs operation of degree of freedom of six axes by a cooperative operation of the supporting stand B, the end effector E, and each of the drive units M1 to M6 of the manipulator M. The movable portion A may operate with degree of freedom of five axes or less, or may operate with degree of freedom of seven axes or more.

Each of the drive unit M1 to the drive unit M6 included in the manipulator M is connected to the robot control device 30 via a cable so as to communicate with each other. With this, each of the drive units M1 to M6 operates the manipulator M based on the control signal acquired from the robot control device 30. Wired communication via a cable is performed according to standards such as Ethernet (registered trademark) and USB, for example. In addition, some or all of the six actuators included in the manipulator M are configured to be connected to the robot control device 30 by wireless communication performed according to a communication standard such as Wi-Fi (registered trademark).

In this example, the robot control device 30 is a controller that controls (operates) the robot 20. The robot control device 30 specifies one or more teaching points in the order indicated by an operation program, based on the operation program stored in advance in a memory (not illustrated in FIG. 1) included in the robot control device 30. The teaching point is a virtual point which is a target for making a control point of the robot 20 coincide with the teaching point. The position and orientation are correlated with each teaching point. Here, the control point of the robot 20 is a virtual point which is set in the robot 20 that moves together with the robot 20, and is, for example, a tool center point (TCP) of the robot 20. The control point may be another virtual point which is set in the robot 20 instead of the TCP. In a case where the control point is made to coincide with a certain teaching point, the position and orientation of the control point coincide with the position and orientation of the teaching point. The robot control device 30 calculates the rotation angle of each of the joints J1 to J6, based on the specified teaching point and inverse kinematics, in a case where the control point coincides with the teaching point. The robot control device 30 generates control signals for respectively driving the drive units M1 to M6, based on the calculated rotation angle. The robot control device 30 drives the drive unit M1 to the drive unit M6 based on the generated control signal to make the control point coincide with the teaching point. With this, the robot control device 30 can operate the robot 20, and as a result, the robot 20 can perform the operation indicated by the operation program.

Figure 2:
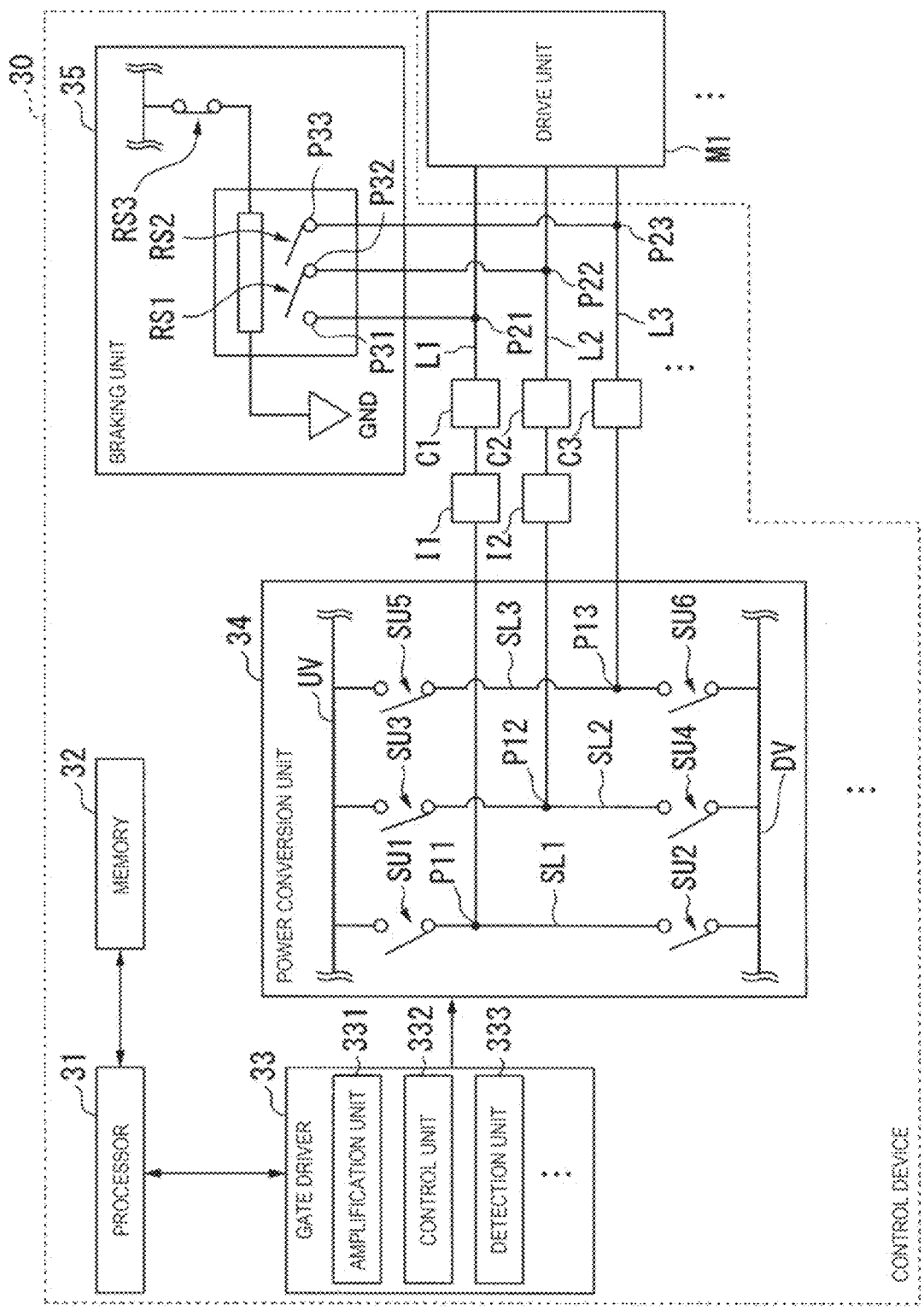
FIG. 2 is a diagram illustrating an example of a configuration of a robot control device.

Here, a configuration of the robot control device 30 will be described referring to FIG. 2. FIG. 2 is a diagram illustrating an example of the configuration of the robot control device 30. In the following, as an example, a case where the robot control device 30 drives the drive unit M1 will be described. For that reason, in FIG. 2, in order to simplify the drawing, a configuration for driving the drive unit M1 in the configuration of the robot control device 30 is illustrated. That is, in FIG. 2, a configuration for driving each of the drive units M2 to M6 in the configuration of the robot control device 30 is omitted. The configuration for driving each of the drive units M2 to M6 in the configuration of the robot control device 30 may be the same as the configuration for driving the drive unit M1 in the configuration of the robot control device 30 or may be different from that for driving the drive unit M1 in the configuration of the robot control device 30. In the following, as an example, description will be made on a case where the configuration for driving each of the drive units M2 to M6 in the configuration of the robot control device 30 is the same as the configuration for driving the drive unit M1 in the configuration of the robot control device 30.

In the configuration for driving the drive unit M1 among the configuration of the robot control device 30, a processor 31, a memory 32, a gate driver 33, a power conversion unit (for example, a power converter) 34, a braking unit (for example, a brake) 35, an inductance element C1, an inductance element C2, an inductance element C3, a current detection unit (for example, a current detector) I1, and a current detection unit (for example, a current detector) I2 are included.

The processor 31 controls the entire robot control device 30. The processor 31 is, for example, a central processing unit (CPU). The processor 31 may be another processor such as a field programmable gate array (FPGA). The processor 31 specifies one or more teaching points in the order indicated by the operation program, based on the operation program stored in advance in the memory 32. Based on the specified teaching point and the inverse kinematics, the processor 31 calculates the rotation angle of each of the joints J1 to J6 in a case where the control point coincides with the teaching point. The processor 31 generates a control signal for driving the drive unit M1 based on the rotation angle for rotating the joint J1 among the calculated rotation angles. The processor 31 outputs the generated control signal to the gate driver 33.

The memory 32 includes, for example, a hard disk drive (HDD), a solid state drive (SSD), an electrically erasable programmable read-only memory (EEPROM), a read-only memory (ROM), a random access memory (RAM), and the like. The memory 32 may be an external storage device connected by a digital input/output port such as a USB, instead of the built-in memory of the robot control device 30. The memory 32 stores various pieces of information to be processed by the robot control device 30, the operation program described above, and the like.

The gate driver 33 includes, for example, an amplification unit 331, a control unit 332, and a detection unit 333. These functional units of the gate driver 33 are hardware functional units such as a large scale integration (LSI) and an application specific integrated circuit (ASIC). Some or all of the functional units may be software functional units. The gate driver 33 may be configured to include another functional unit instead of these functional units.

The amplification unit 331 acquires a control signal for driving the drive unit M1 from the processor 31. The amplification unit 331 amplifies the acquired control signal.

The control unit 332 controls the power conversion unit 34 based on the control signal amplified by the amplification unit 331 and causes the power conversion unit 34 to drive the drive unit M1. Here, the power conversion unit 34 will be described.

The power conversion unit 34 is connected to the drive unit M1 by a power line. In this example, since the drive unit M1 is a motor driven by three-phase AC, the power conversion unit 34 is connected to the drive unit M1 by a power line L1, a power line L2, and a power line L3, which are three power lines. In the following, for convenience of explanation, each of the three phases will be referred to as a U-phase, a V-phase, and a W-phase. The power line L1 is a power line that supplies electric power to a U-phase electromagnet of the drive unit M1. The power line L2 is a power line that supplies electric power to a V-phase electromagnet of the drive unit M1. The power line L3 is a power line that supplies electric power to a W-phase electromagnet of the drive unit M1.

The power conversion unit 34 includes a wiring UV to which a predetermined voltage is applied from a power supply (not illustrated) included in the robot control device 30, a wiring DV which is grounded to the ground, and a plurality of switching elements.

The wiring UV and the wiring DV are connected by a wiring SL1. The wiring SL1 has a connection point P11 between the wiring UV and the wiring DV. The connection point P11 is connected to the power line L1. In the wiring SL1, a switching element SU1 is provided between the connection point P11 and the wiring UV. In the wiring SL1, a switching element SU2 is provided between the connection point P11 and the wiring DV. Here, each of the switching element SU1 and the switching element SU2 is one of the plurality of switching elements of the power conversion unit 34.

The wiring UV and the wiring DV are connected by a wiring SL2. The wiring SL2 has a connection point P12 between the wiring UV and the wiring DV. The connection point P12 is connected to the power line L2. In the wiring SL2, a switching element SU3 is provided between the connection point P12 and the wiring UV. In the wiring SL2, a switching element SU4 is provided between the connection point P12 and the wiring DV. Here, each of the switching element SU3 and the switching element SD4 is one of the plurality of switching elements of the power conversion unit 34.

The wiring UV and the wiring DV are connected by a wiring SL3. The wiring SL3 has a connection point P13 between the wiring UV and the wiring DV. The connection point P13 is connected to the power line L3. In the wiring SL3, a switching element SU5 is provided between the connection point P13 and the wiring UV. In the wiring SL3, a switching element SU6 is provided between the connection point P13 and the wiring DV. Here, each of the switching element SU5 and the switching element SU6 is one of the plurality of switching elements of the power conversion unit 34.

The switching element SU1 is a semiconductor element that switches ON/OFF (that is, switching) of a switch included in the switching element SU1 and is, for example, a field effect transistor (FET). The switching element SU1 may be another semiconductor element which switches ON/OFF of the switch, such as a gate turn off thyristor (GTO), or insulated gate bipolar transistor (IGBT), instead of the FET, or may be another element that switches ON/OFF of the switch instead of the semiconductor element.

A configuration of each of the switching elements SU2 to SU6 is the same as the configuration of the switching element SU1, and thus the description thereof will be omitted.

Here, the control unit 332 turns each of the switching elements SU1 to SU6 included in the power conversion unit 34 ON/OFF, based on the control signal which is amplified by the amplification unit 321 and is for driving the drive unit M1. With this, the control unit 332 causes the power conversion unit 34 to convert power (namely, voltage applied to the wiring UV), which is supplied from a power supply (not illustrated) of the robot control device 30 to the power conversion unit 34, into power to be supplied to the drive unit M1. The power converted by the power conversion unit 34 is supplied to the drive unit M1. More specifically, the control unit 332 switches ON/OFF of each of the switching elements SU1 to SU6 included in the power conversion unit 34 based on the control signal, thereby causing the power conversion unit 34 to perform switching control of the drive unit M1 (For example, pulse width modulation (PWM) control).

Description returns to the functional units of the gate driver 33. The detection unit 333 detects an abnormality of the robot control device 30. The abnormality includes, for example, occurrence of an overcurrent in the robot control device 30, a decrease in the voltage supplied to the robot control device 30, occurrence of overheating in the robot control device 30, and the like. In a case where the abnormality is detected, the detection unit 333 outputs information indicating the detected abnormality to the processor 31. In this case, the processor 31 controls the braking unit 35 to brake the drive unit M1. Here, the braking unit 35 will be described.

The braking unit 35 brakes the drive unit M1 by short-circuiting the power lines connecting the robot control device 30 and the drive unit M1 (that is, between the power line L1, the power line L2, and the power line L3). The braking unit 35 is a dynamic brake configured with by a relay switch which includes a switch RS1, a switch RS2, and a switch RS3 and is a normally-on relay switch.

The switch RS1 is a switch connecting a connection point P31 and a connection point P32. The connection point P31 is connected to the connection point P21 which is a connection point included on the power line L1 and is positioned between the drive unit M1 and the power conversion unit 34 by a wiring. The connection point P32 is connected to a connection point P22 which is a connection point included on the power line L2 and is positioned between the drive unit M1 and the power conversion unit 34 by a wiring.

The switch RS2 is a switch connecting the connection point P32 described above and a connection point P33. The connection point P33 is connected to a connection point P23 which is a connection point included on the power line L3 and is positioned between the drive unit M1 and the power conversion unit 34 by a wiring.

The switch RS3 is connected to the processor 31 and is turned ON in a case where a voltage is supplied from the processor 31, and is turned OFF in a case where the voltage supplied from the processor 31 becomes equal to or less than a predetermined value.

Figure 3:
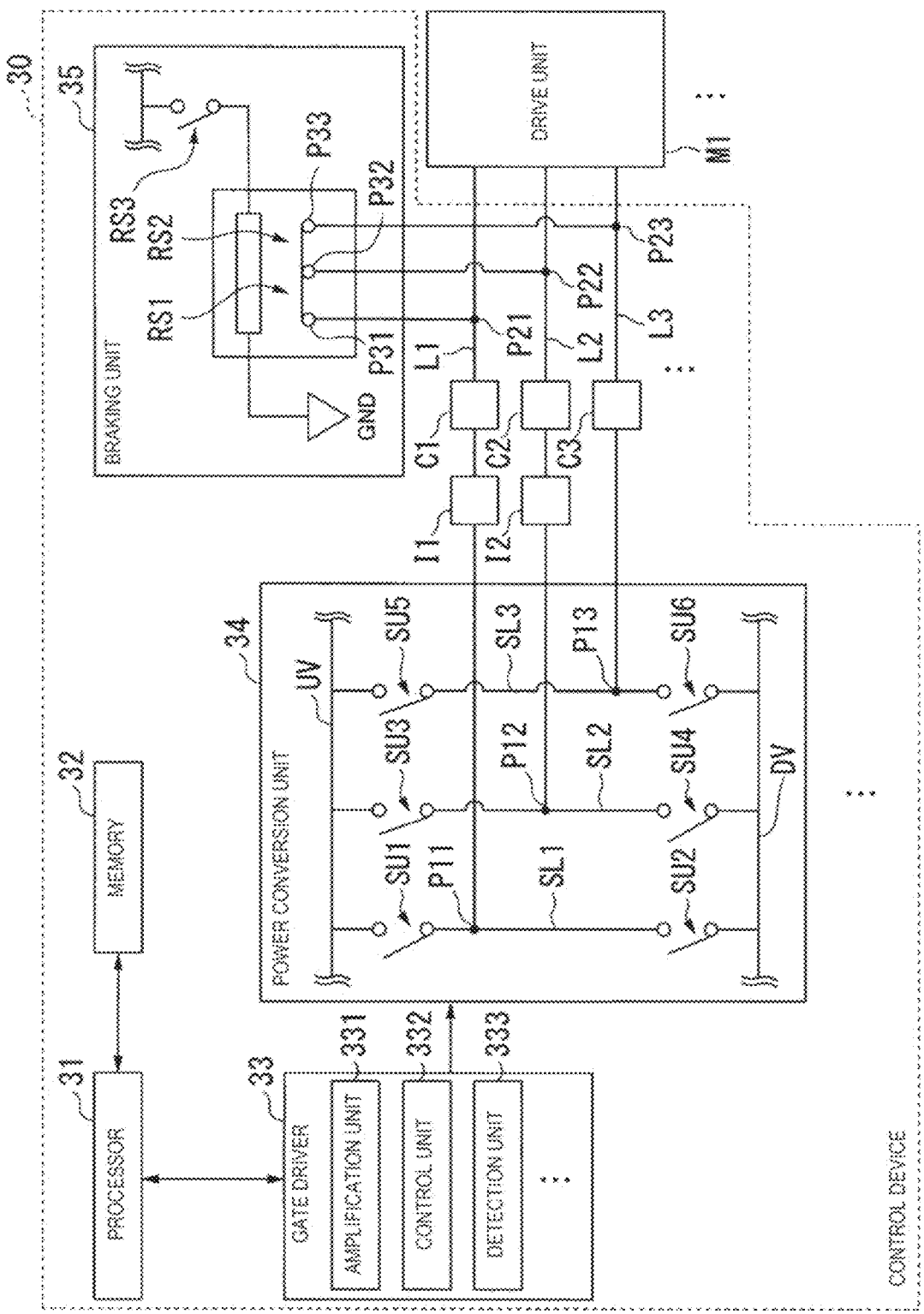
FIG. 3 is a diagram illustrating an example of a state in which three power lines of a power line L1 to a power line L3 are short-circuited.

Here, the switches RS1 and RS2 are switched ON/OFF in conjunction with ON/OFF of the switch RS3. As described above, the braking unit 35 is a normally-on relay switch. For that reason, the switches RS1 and RS2 are respectively turned OFF when the switch RS3 is turned ON. The switches RS1 and RS2 are respectively turned ON when the switch RS3 is turned OFF. With this, as illustrated in FIG. 3, the braking unit 35 can short-circuit the three power lines of the power line L1 to the power line L3. FIG. 3 is a diagram illustrating an example of a state in which the three power lines of the power line L1 to the power line L3 are short-circuited.

In a case where the braking unit 35 short-circuits the three power lines of the power line L1 to the power line L3, a regenerative current generated by driving the drive unit M1 flows in each of the three power lines. Due to this regenerative current, the braking unit 35 brakes the drive unit M1.

Return to the description of the detection unit 333. As described above, in a case where an abnormality is detected, the detection unit 333 outputs information indicating the detected abnormality to the processor 31. In this case, the processor 31 turns the switch RS3 of the braking unit 35 OFF, thereby short-circuiting the three power lines of the power line L1 to the power line L3 and braking the drive unit M1.

As described above, the switch RS3 is turned OFF when the voltage supplied from the processor 31 becomes equal to or less than a predetermined value. For that reason, even if the processor 31 stops operating in the case where supply of power to the robot control device 30 is interrupted for some reason, the braking unit 35 can short-circuit the three power lines of the power line L1 to the power line L3 to brake the drive unit M1.

As described above, the robot control device 30 includes the gate driver 33, the power conversion unit 34, and the braking unit 35. Here, in a case where the control unit 332 of the gate driver 33 causes the power conversion unit 34 to perform switching control of the drive unit M1, high-frequency noise is generated in each of the three power lines of the power line L1 to the power line L3. In a case where the noise is not suppressed, the robot control device 30 makes it difficult to cause the robot 20 to perform work with high accuracy. Accordingly, the robot control device 30 in this example includes the inductance element C1 to the inductance element C3, in addition to the gate driver 33, the power conversion unit 34, and the braking unit 35.

The inductance element C1 is an element having inductance, and is, for example, a choke coil. The inductance element C may be another element having inductance such as a flux gate sensor, instead of the choke coil.

The inductance element C1 is provided on the power line L1. More specifically, the inductance element C1 is provided closer to the power conversion unit 34 than the connection point P21 included on the power line L1. In the example illustrated in FIG. 2, the inductance element C1 is positioned between the connection point P21 and the connection point P11. With this, no regenerative current flows from the drive unit M1 to the inductance element C1 even in a case where the braking unit 35 short-circuits the three power lines of the power line L1 to the power line L3. As a result, the robot control device 30 can suppress high-frequency noise generated in the power line L1 and can suppress the inductance element C1 from generating heat due to the regenerative current.

Since the configuration of the inductance element C2 is the same as the configuration of the inductance element C1, description thereof will be omitted. The inductance element C2 is provided on the power line L2. More specifically, the inductance element C2 is provided closer to the power conversion unit 34 than the connection point P22 included on the power line L2. In the example illustrated in FIG. 2, the inductance element C2 is positioned between the connection point P22 and the connection point P12. With this, no regenerative current flows from the drive unit M1 to the inductance element C2 even in a case where the braking unit 35 short-circuits the three power lines of the power line L1 to the power line L3. As a result, the robot control device 30 can suppress high-frequency noise generated in the power line L2 and can suppress the inductance element C2 from generating heat due to the regenerative current.

Since the configuration of the inductance element C3 is the same as the configuration of the inductance element C1, description thereof will be omitted. The inductance element C3 is provided on the power line L3. More specifically, the inductance element C3 is provided closer to the power conversion unit 34 than the connection point P23 included on the power line L3. In the example illustrated in FIG. 2, the inductance element C3 is positioned between the connection point P23 and the connection point P13. With this, no regenerative current flows from the drive unit M1 to the inductance element C3 even in a case where the braking unit 35 short-circuits the three power lines of the power line L1 to the power line L3. As a result, the robot control device 30 can suppress high-frequency noise generated in the power line L3 and can suppress the inductance element C3 from generating heat due to the regenerative current.

Here, in this example, as the size of the inductance element C1 to the inductance element C3, which are the choke coils, increases, the heat resistance of the inductance element C1 to the inductance element C3 and the price thereof increase in many cases. For that reason, in a case where heat generation of the inductance element C1 to the inductance element C3 due to the regenerative current is suppressed, the robot control device 30 can achieve miniaturization of the inductance element C1 to the inductance element C3 (then, miniaturization of the robot control device 30 accompanying the miniaturization of the inductance element C1 to the inductance element C3) and suppression of the manufacturing cost.

Figure 4:
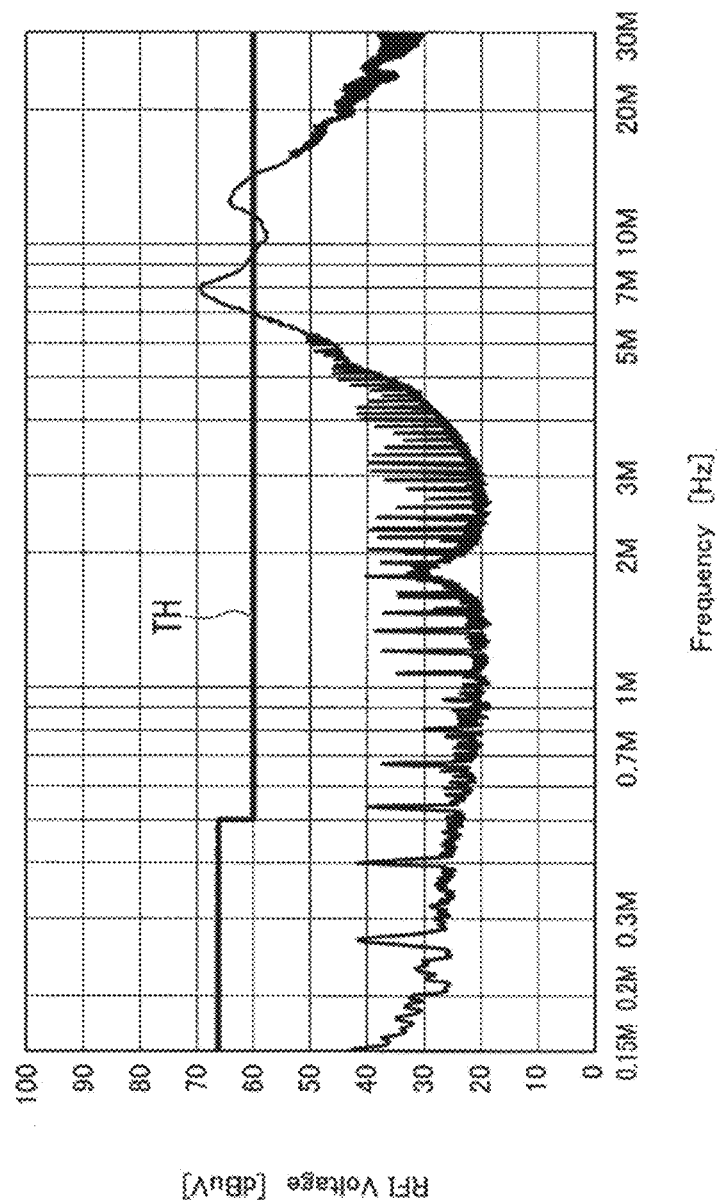
FIG. 4 is a graph illustrating an example of high frequency noise generated from the three power lines of the power line L1 to the power line L3 in a case where the robot control device does not include an inductance element C1 to an inductance element C3.
Figure 5:
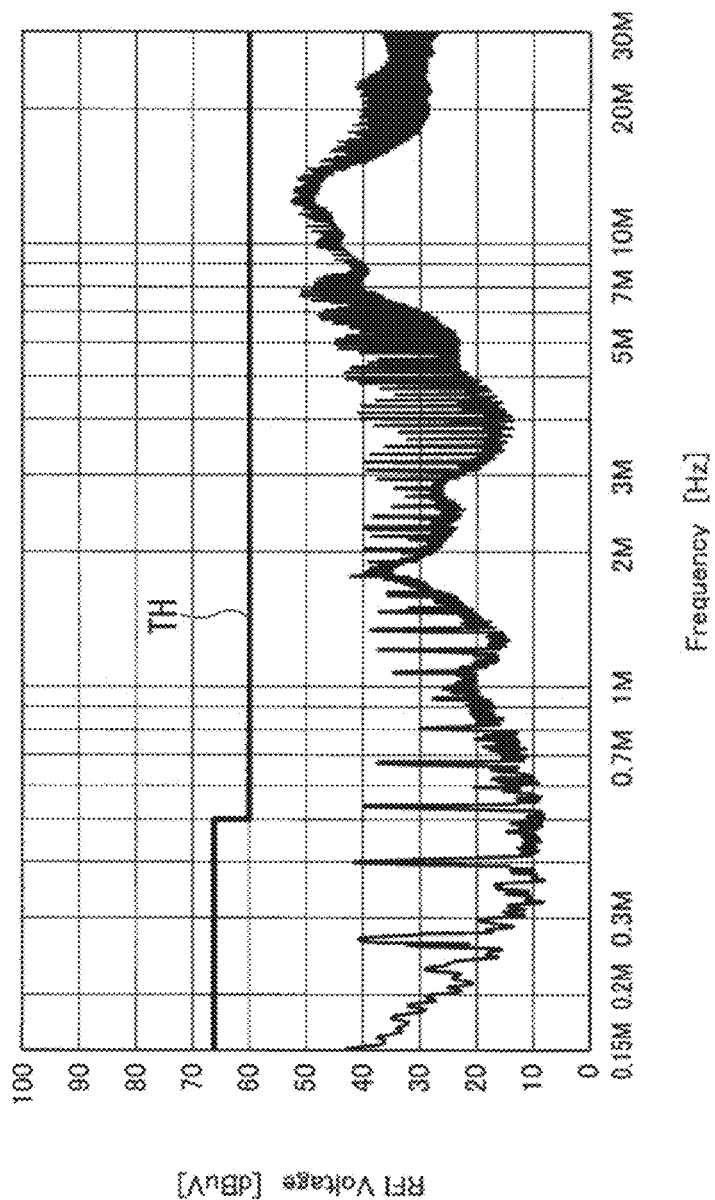
FIG. 5 is a graph illustrating an example of high frequency noise generated from the three power lines of the power line L1 to the power line L3 in a case where the robot control device includes the inductance element C1 to the inductance element C3 as illustrated in FIG. 2.

FIG. 4 is a graph illustrating an example of high-frequency noise generated from the three power lines of the power line L1 to the power line L3 in a case where the robot control device 30 does not include the inductance element C1 to the inductance element C3. FIG. 5 is a graph illustrating an example of high-frequency noise generated from the three power lines of the power line L1 to the power line L3 in a case where the robot control device 30 includes the inductance element C1 to the inductance element C3 as illustrated in FIG. 2. Each of the horizontal axes of the graphs illustrated in FIGS. 4 and 5 indicates a frequency of noise. Each of the vertical axes of the graphs indicates magnitude of the noise of the frequency indicated by each of the horizontal axes of the graphs. In the graphs illustrated in FIGS. 4 and 5, a value TH indicates an upper limit value of noise that can be allowed in the control of the robot 20 by the robot control device 30. In the graph illustrated in FIG. 4, high-frequency noise generated from the three power lines exceeds the value TH in a portion of a frequency band of 7 MHz or more. On the other hand, in the graph illustrated in FIG. 5, the noise does not exceed the value TH in any frequency band. That is, in a case where the robot control device 30 includes the inductance element C1 to the inductance element C3, it is understood that the noise is suppressed. That is, in a case where the robot control device 30 includes the inductance element C1 to the inductance element C3 as illustrated in FIG. 2, the robot control device 30 can suppress the noise by the inductance element C1 to the inductance element C3 and suppress heat generation of each of the inductance elements C1 to C3 due to the short circuit between the three power lines L1 to L3.

In the example illustrated in FIG. 2, the robot control device 30 includes the current detection unit I1 and the current detection unit I2, in addition to the gate driver 33, the power conversion unit 34, the braking unit 35, and the inductance element C1 to the inductance element C3.

The current detection unit I1 includes a shunt resistor and detects a current corresponding to a potential difference between both ends of the shunt resistor. The current detection unit I1 is provided between the connection point P21 and the connection point P11 (more specifically, between inductance element C1 and connection point P11) described above. That is, the current detection unit I1 detects the current flowing through the power line L1. Since the current detection unit I1 is positioned between the connection point P21 and the connection point P11, the regenerative current does not flow to the current detection unit I1 even in a case where the braking unit 35 short-circuits the three power lines of the power line L1 to the power line L3. For that reason, an inexpensive sensor having low heat resistance can be used for the current detection unit I1. As a result, the robot control device 30 can suppress the manufacturing cost. The current detection unit I1 may be any sensor as long as it can detect the current. Further, the current detection unit I1 may be configured to include a Hall element, a flux gate sensor, or the like, instead of the shunt resistor.

A configuration of the current detection unit I2 is the same as the configuration of the current detection unit I1, and thus the description thereof will be omitted. The current detection unit I2 is provided between the connection point P22 and the connection point P12 (more specifically, between inductance element C2 and connection point P12). That is, the current detection unit I2 detects the current flowing through the power line L2. Since the current detection unit I2 is positioned between the connection point P22 and the connection point P12, the regenerative current does not flow to the current detection unit I2 even in a case where the braking unit 35 short-circuits the three power lines of the power lines L1 to L3. For that reason, an inexpensive sensor having low heat resistance can be used for the current detection unit I2. As a result, the robot control device 30 can suppress the manufacturing cost. The current detection unit I2 may be any sensor as long as it can detect the current.

Here, in a case where a current flowing through each of the power line L1 and the power line L2 is detected, the current flowing in the power line L3 can be calculated by Kirchhoff's laws. For that reason, in the example illustrated in FIG. 2, the robot control device 30 does not include a current detection unit provided on the power line L3.

Since the current detection unit I1 and the current detection unit I2 are included, the control unit 332 of the gate driver 33 can perform vector control when controlling the drive unit M1 via the power conversion unit 34. The control unit 332 acquires information indicating the current detected by the current detection unit I1 and information indicating the current detected by the current detection unit I2 each time a predetermined time elapses. The control unit 332 specifies the currents flowing through the power lines L1 to L3, respectively, based on the pieces of acquired information. The control unit 332 performs vector control of the drive unit M1 via the power conversion unit 34 based on the specified current. The vector control may be realized by a known control method or may be realized by a control method developed from now.

Further, the robot control device 30 may be configured not to include the current detection unit I1 and the current detection unit I2. In this case, the control unit 332 does not perform vector control of the drive unit M1 via the power conversion unit 34.

Some or all of the functional units (amplification unit 331, control unit 332, and detecting unit 333) included in the gate driver 33 described above may be integrated with the power conversion unit 34, or may be configured separately.

Some or all of the functional units (amplification unit 331, control unit 332, and detecting unit 333) included in the gate driver 33 described above, the power conversion unit 34, the braking unit 35, and the inductance elements C1 to C3 may be mounted on the same substrate (a single substrate), or may be respectively mounted on a plurality of substrates.

Further, in a case where the braking unit 35 short-circuits the three power lines of the power line L1 to the power line L3, the control unit 332 included in the gate driver 33 described above may be configured to turn each of the switching elements SU1 to SU6 OFF. With this, the robot control device 30 can suppress the regenerative current generated in the drive unit M1 from flowing to the gate driver 33 and the processor 31 via the power conversion unit 34.

As described above, the robot control device 30 includes a power conversion unit (power conversion unit 34 in the example described above) which is connected to a drive unit (drive unit M1 in the example described above) by a power line (power line L1 to the power line L3 in the example described above) and converts the supplied power to power to be supplied to the drive unit, a braking unit (braking unit 35 in the example described above) for braking the drive unit by short-circuiting the power lines, and an inductance element (in the example described above, inductance element C1 to the inductance element C3) provided in the power line and positioned closer to the power conversion unit side than a connection point between the braking unit and the power line (in the example described above, connection points P21 to P23). With this, the robot control device 30 can suppress noise by the inductance element and can suppress heat generation of the inductance element due to a short circuit between the power lines.

The robot control device 30 includes a detection unit (in the example described above, detection unit 333) for detecting an abnormality, and short-circuits the power lines in a case where the detection unit detects the abnormality. With this, the robot control device 30 can suppress heat generation of the inductance element due to the short circuit between the power lines according to detection of the abnormality by the detection unit.

In the robot control device 30, the power conversion unit includes a plurality of switching elements (switching elements SU1 to SU6 in the example described above), and turns switches of the plurality of switching elements OFF in a case where the detection unit detects an abnormality. With this, the robot control device 30 can suppress heat generation of the inductance element due to a short circuit between the power lines while suppressing the current from flowing into the power conversion unit due to the short circuit between the power lines.

In the robot control device 30, the detection unit is integrated with the power conversion unit. With this, the robot control device 30 can suppress heat generation of the inductance element due to the short circuit between the power lines according to the detection of the abnormality by the detection unit integrated with the power conversion unit.

In the robot control device 30, the power conversion unit, the detection unit, the braking unit, and the inductance element are mounted on the same substrate. With this, the robot control device 30 can suppress heat generation of the inductance elements mounted on the same substrate together with the power conversion unit, the detection unit, and the braking unit, and the heat generation of the inductance element is due to a short circuit between the power lines.

In the robot control device 30, in a case where the voltage supplied to the braking unit becomes equal to or less than a predetermined value, the braking unit short-circuits the power lines. With this, the robot control device 30 can suppress heat generation of the inductance element due to the short circuit between the power lines in response to the voltage supplied to the braking unit becoming a predetermined value or less.

In the robot control device 30, a current detection unit provided on the power line and positioned between the power conversion unit and the inductance element is further included. With this, the robot control device 30 can suppress heat generation of the inductance element due to the short circuit between the power lines while performing control based on the current flowing in the power line (vector control in the example described above).

Further, in the robot control device 30, the drive unit includes a motor driven by a multi-phase alternating current. With this, the robot control device 30 can suppress noise by the inductance element, and can suppress heat generation of the inductance element due to a short circuit between the power lines connected to the motor driven by the multi-phase alternating current.

Although the embodiment of the invention has been described in detail with reference to the drawings, a specific configuration is not limited to this embodiment, and various modifications, substitutions, deletions, and the like may be made thereto without departing from the spirit of the invention.

The entire disclosure of Japanese Patent Application No. 2017-186230, filed Sep. 27, 2017 is expressly incorporated by reference herein.

What is claimed is:

1. A robot control device that controls a robot including a motor, the robot control device comprising:
   a power converter that is connected to the motor by a power line and converts supplied power to power to be supplied to the motor;
   a brake that is connected to the power line by a brake line, the brake being configured to brake the motor by short-circuiting the power line, a connection point between the brake line and the power line being provided between the power converter and the motor;
   a current detector being provided on the power line between the power converter and the connection point; and
   an inductance element that is provided on the power line between the current detector and the connection point and positioned closer to the power converter than the connection point between the brake line and the power line.

2. The robot control device according to claim 1, further comprising:
   a detector that detects an abnormality,
   wherein the brake short-circuits the power lines in a case where the detector detects an abnormality.

3. The robot control device according to claim 2,
   wherein the power converter further includes a plurality of switching elements, and
   turns switches of the plurality of switching elements OFF in a case where the detector detects the abnormality.

4. The robot control device according to claim 2,
wherein the detector is integrated with the power converter.

5. The robot control device according to claim 2,
wherein the power converter, the detector, the brake, and the inductance element are mounted on the same substrate.

6. The robot control device according to claim 1,
wherein the brake short-circuits the power lines in a case where a voltage supplied to the brake becomes equal to or less than a predetermined value.

7. The robot control device according to claim 1,
wherein the motor includes a motor driven by a multiphase alternating current.

8. A robot that is controlled by a robot control device, the robot comprising:
a power converter that is connected to the motor by a power line and converts supplied power to power to be supplied to the motor;
a brake that is connected to the power line by a brake line, the brake being configured to brake the motor by short-circuiting the power line, a connection point between the brake line and the power line being provided between the power converter and the motor;
a current detector being provided on the power line between the power converter and the connection point; and
an inductance element that is provided on the power line between the current detector and the connection point and positioned closer to the power converter than the connection point between the brake line and the power line.

9. The robot according to claim 8, further comprising:
a detector that detects an abnormality,
wherein the brake short-circuits the power lines in a case where the detector detects an abnormality.

10. The robot according to claim 9,
wherein the power converter further includes a plurality of switching elements, and
turns switches of the plurality of switching elements OFF in a case where the detector detects the abnormality.

11. The robot according to claim 9,
wherein the detector is integrated with the power converter.

12. The robot according to claim 9,
wherein the power converter, the detector, the brake, and the inductance element are mounted on the same substrate.

13. The robot according to claim 8,
wherein the brake short-circuits the power lines in a case where a voltage supplied to the brake becomes equal to or less than a predetermined value.

14. A robot system comprising:
a robot including a motor; and
a robot control device that controls the robot, wherein
the robot control device includes a power converter that is connected to the motor by a power line and converts supplied power to power to be supplied to the motor, a brake that is connected to the power line by a brake line, the brake being configured to brake the motor by short-circuiting the power line, a current detector provided on the power line between the power converter and the connection point, and an inductance element that is provided on the power line between the current detector and the connection point and positioned closer to the power converter than a connection point between the brake line and the power line,
wherein the connection point between the brake and the power line is provided between the power converter and the motor.

15. The robot system according to claim 14, further comprising:
a detector that detects an abnormality,
wherein the brake short-circuits the power lines in a case where the detector detects an abnormality.

16. The robot system according to claim 15,
wherein the power converter further includes a plurality of switching elements, and
turns switches of the plurality of switching elements OFF in a case where the detector detects the abnormality.

17. The robot system according to claim 15,
wherein the detector is integrated with the power converter.

18. The robot system according to claim 15,
wherein the power converter, the detector, the brake, and the inductance element are mounted on the same substrate.

19. The robot system according to claim 14,
wherein the brake short-circuits the power lines in a case where a voltage supplied to the brake becomes equal to or less than a predetermined value.

* * * * *